C. M. PLATT.

Improvement in Tin-lined Iron Pipe.

No. 122,131.  Patented Dec. 26, 1871.

Witnesses:
Chas. Nida
H. L. Wattenberg

Inventor:
Clark M. Platt
per J. M. Linkin.
Atty

122,131

UNITED STATES PATENT OFFICE.

CLARK M. PLATT, OF WATERBURY, CONNECTICUT.

IMPROVEMENT IN TIN-LINED IRON PIPE.

Specification forming part of Letters Patent No. 122,131, dated December 26, 1871.

*To all whom it may concern:*

Be it known that I, CLARK M. PLATT, of Waterbury, in the county of New Haven and State of Connecticut, have invented a new and useful Improvement in Tin-Lined Iron Pipe; and that the following is a full, clear, and exact description of the same, reference being had to the accompanying drawing and to the letters of reference marked thereon making a part of this specification.

The object of this invention is to produce a strong and at the same time an entirely innoxious pipe for conveying water and other fluids, it being well known that lead, tin-lined lead, and galvanized or zinced-iron pipes are poisonous, some in themselves and others by reason of galvanic action. The present invention, it is believed, entirely obviates this difficulty; and consists in lining an ordinary wrought or even cast-iron pipe with pure tin, in the manner hereinafter fully described.

Figure 1:
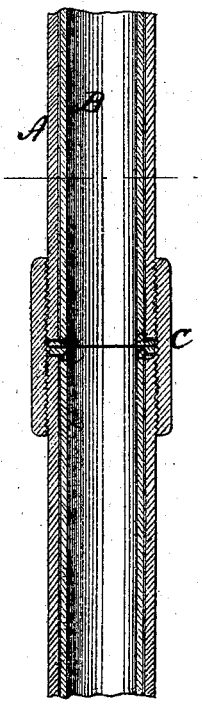
Figure 2:
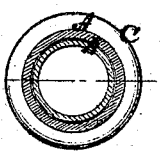

In the accompanying sheet of drawing, Figure 1 represents a longitudinal section of my pipe; Fig. 2, a cross-section, and Fig. 3 a section of "turn."

Similar letters of reference indicate like parts in the several figures.

A is a pipe of wrought or cast-iron, of any desired length and diameter. Fitting into this pipe is a second pipe, B, made from pure tin. The pipes being in this way arranged one within the other, by means of hydrostatic pressure the interior pipe B is uniformly forced into intimate contact with the interior of the pipe A, in this way forming a smooth and compact lining of pure tin within the iron tube. The ends of the interior tube B are allowed to project slightly beyond the ends of the exterior tube A, and are turned carefully over such ends, so as to entirely cover them, and present nothing but the pure tin surface to the action of the water. (See *a*, Fig. 1.) Lengths of pipe thus made may be coupled together by means of the coupling C, or in any convenient manner.

In a pipe constructed as above described we have combined strength, purity, and economy, the water passing through without stain, and without receiving particles of metallic poison; and the cost of making such a pipe being necessarily small, since the process of manufacture is simple and inexpensive, the tin lining being just as thin as possible consistent with the end to be attained.

Figure 3:
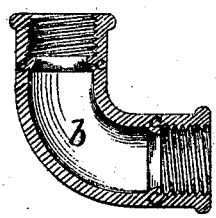

When it becomes necessary in fitting to change the direction of the pipe it is accomplished by means of turns or "bends" *b*, Fig. 3, the interior of which is lined with tin in a manner similar to that above described. These turns or bends will in most instances be made of cast or malleable iron, and within them will be cast a small annular projection, *c*, against which the end *a* of the tin lining will be forced when the turn and pipe are screwed together, in this way insuring tightness and presenting nothing but pure tin surface to the action of the water.

Having thus described my invention, what I claim as new, and desire to secure by Letters Patent, is—

A tin-lined iron pipe, constructed in the manner and for the purpose herein described.

CLARK M. PLATT.

Witnesses:
GEORGE H. COWELL,
FRANKLIN L. WELTON.            (163)